United States Patent [19] [11] Patent Number: 4,606,421
Schroeder [45] Date of Patent: Aug. 19, 1986

[54] SHIFT-ERROR ADJUSTMENT FOR LOAD CELL SUPPORT

[75] Inventor: Karl S. Schroeder, Clayton, Ohio

[73] Assignee: Hobart Corporation, Troy, Ohio

[21] Appl. No.: 764,030

[22] Filed: Aug. 9, 1985

[51] Int. Cl.⁴ .................. G01G 3/14; G01G 3/08; G01L 25/00; G01L 1/22
[52] U.S. Cl. .................. 177/211; 177/229; 73/1 B; 73/862.65
[58] Field of Search .................. 177/211, 229, 255; 73/862.65, 1 B

[56] References Cited

U.S. PATENT DOCUMENTS 4,181,011  1/1980  Brendel .................. 73/862.65
4,196,784  4/1980  Suzuki et al. .................. 177/211
4,485,881  12/1984  Tramposch et al. .................. 177/211
4,505,345  3/1985  Jetter .................. 73/862.65 X
4,561,512  12/1985  Tramposch .................. 177/229

OTHER PUBLICATIONS

Article entitled, "A Fabricated Platform Load Cell", *Weighing & Measurement,* Werner J. Ort, Aug. 1984.

*Primary Examiner*—George H. Miller, Jr.
*Attorney, Agent, or Firm*—Biebel, French & Nauman

[57] ABSTRACT

A shift-error adjuster is incorporated into a substantially parallelogram guiding frame or flexure of a platform load cell to permit adjustment of the flexure to compensate for off-center loading of a scale incorporating the platform load cell. First and second vertically oriented end sections are interconnected by upper and lower deflection sections to form the parallelogram flexure. First and second reduced thickness bending portions are formed into the upper end of one of the end sections to define first and second axes which are perpendicular to one another. Vertically oriented adjusting screws are associated with each of the reduced thickness bending portions to effect bending of the end section about the first and second axes to thereby adjust the vertical spacing between the interconnections of that end section and the upper and lower deflection sections.

10 Claims, 3 Drawing Figures

SHIFT-ERROR ADJUSTMENT FOR LOAD CELL SUPPORT

BACKGROUND OF THE INVENTION

This invention relates generally to a platform load cell wherein a transducer is supported within a parallelogram guiding frame which conveys forces to be measured to the transducer and, more particularly, to a shift-error adjuster for compensating the guiding frame for off-center loading.

There are many applications for platform load cells with a primary example being the retail scale which is used, for example, in a supermarket, for weighing meat, produce and the like to determine prices for commodities to be sold. In such weighing scales, a weight or force to be measured is transmitted by a guiding frame, which may be referred to herein as a flexure, to a transducer, typically comprising strain gauges, which in turn generate signals representative of the weight or force.

A common form of platform load cell comprises a parallelogram guiding frame or flexure which includes force transmitting beams to which strain gauges are directly connected or to which a load cell including strain gauges may be coupled. Illustrative parallelogram flexures are disclosed, for example, in U.S. Pat. Nos. 4,181,011 and 4,196,784. Unfortunately, problems have been encountered when using such flexures.

One particularly annoying problem with parallelogram flexures is that the weight indicated by a weighing scale varies dependent upon the position that an object to be weighed is placed on the weighing platform of the scale. This problem of shift errors in the registered weights due to off-center loading of a scale and compensation for such shift errors is addressed in Tramposch et al., U.S. Pat. No. 4,485,881. Tramposch et al. discloses a parallelogram flexure for supporting a transducer wherein shift-error adjusting means is included within a fixed first section of the flexure.

The adjusting means comprises a generally U-shaped opening formed into the inner side of the upper end of the first section of the flexure. A vertical adjusting mechanism comprising a preload screw extends downwardly through the center of the U-shaped opening. A horizontal adjusting mechanism comprises two wedges, one on either side of the preload screw, which are formed to engage the inside walls of the U-shaped opening and may be drawn thereinto by means of adjustment screws threaded into the wedges and extending through the closed base of the opening. By adjusting the preload screw or simultaneously adjusting both adjustment screws, the vertical spacing between flexjoints adjacent to the first fixed section of the flexure may be adjusted, while the vertical spacing between the front or the rear of the two flexjoints may be separately adjusted by adjusting one or the other of the adjustment screws.

While Tramposch et al. provides shift-error adjustment for a parallelogram flexure of a platform load cell, the adjustment wedges obviously interact with one another during adjustment of the flexure and require additional steps for assembly of the flexure and, in certain applications, it may be inconvenient to have to make both a vertical and a horizontal adjustment. It is, therefore, desirable to have a simplified shift-error adjuster for a parallelogram flexure which may be adjusted along only a single direction. Further, the provision of a variety of flexure shift-error adjusting arrangements also serves to advance the art and such alternatives may be preferred in certain applications.

SUMMARY OF THE INVENTION

In accordance with the present invention, a simplified shift-error adjuster is incorporated into a substantially parallelogram guiding frame or flexure of a platform load cell to provide adjustment of the flexure to compensate for off-center loading of a weighing scale incorporating the platform load cell. The flexure comprises first and second vertically oriented end sections which are interconnected by upper and lower deflection sections to form a substantially parallelogram flexure structure. Flexjoints may be formed adjacent to the interconnections of the end sections and the deflection sections to facilitate movement of the flexure as will be apparent to those skilled in the art. Whether or not flexjoints are provided, the shift-error adjuster of the present invention comprises first and second flex means formed into one of the end sections of the flexure and defines first and second axes which are perpendicular to one another. The first axis is substantially parallel to the deflection sections and the second axis is substantially perpendicular to the first axis and, hence, the plane of the parallelogram outline of the flexure. Adjustable control means are associated with the first and second flex means for setting bends or bending the end section incorporating the shift-error adjuster about the first and second axes to adjust the vertical spacing between the interconnections of that end section with the upper and lower deflection sections or the flexjoints if flexjoints are incorporated into the flexure.

The first and second flex means formed into one of the end sections of the flexure to permit shift-error adjustment comprise reduced thickness portions of the end section to facilitate bending or flexing of the end section to effect the adjustments. Preferably, the reduced thickness portions are substantially centered on the end section and are defined by substantially U-shaped slots which are positioned opposite to one another on opposite sides of the end section such that the closed ends of the U-shaped slots define the reduced thickness portions. Also, preferably, the flex means are formed adjacent to one another in one end of the corresponding end section of the flexure such that the shift-error adjustment may completely be performed at that location.

In the illustrative embodiment, first and second adjustable control means each comprise first and second adjusting screws aligned with and threadingly engaged with the end section. The first and second adjusting screws are positioned on opposite sides of the corresponding reduced thickness portion of the end section and extend into the U-shaped slots defining the corresponding reduced thickness portion. The adjusting screws may threadingly engage the bottom of the U-shaped slots such that tightening one of the adjusting screws bends the end section toward that adjusting screw by compressing the opening of the corresponding U-shaped slot. Alternately, the adjusting screws may threadingly engage the upper portion of the end section above the U-shaped slots and abut the lower portion of the U-shaped slot such that tightening one of the adjusting screws tends to cause bending away from that adjusting screw by expansion of the opening of the corresponding U-shaped slot. It is noted that the adjustments made by the first and second control means are substantially independent of one another to facilitate adjustment of the flexure incorporating the present invention.

It is, therefore, a primary object of the present invention to provide an improved platform load cell wherein a parallelogram guiding frame or flexure includes a simplified shift-error adjuster for compensating for off-center loading.

Another object of the present invention is to provide an improved platform load cell wherein a parallelogram guiding frame or flexure may be conveniently adjusted to compensate for off-center loading of an associated scale platform to provide accurate weight determinations and economical manufacture.

Yet another object of the present invention is to provide an improved platform load cell for use in a weighing scale wherein a parallelogram guiding frame or flexure may be conveniently adjusted for shift errors such that the scale will provide accurate readings regardless of the location of an object to be weighed on a weighing platform of the scale.

An additional object of the present invention is to provide an improved platform load cell wherein a parallelogram guiding frame or flexure incorporates two perpendicular flexing portions incorporated into one of two end sections of the flexure such that adjustments made about the two flexing portions are substantially independent.

Other objects and advantages of the invention will be apparent from the following description, the accompanying drawings and the appended claims.

DETAILED DESCRIPTION OF THE INVENTION

Figure 1:
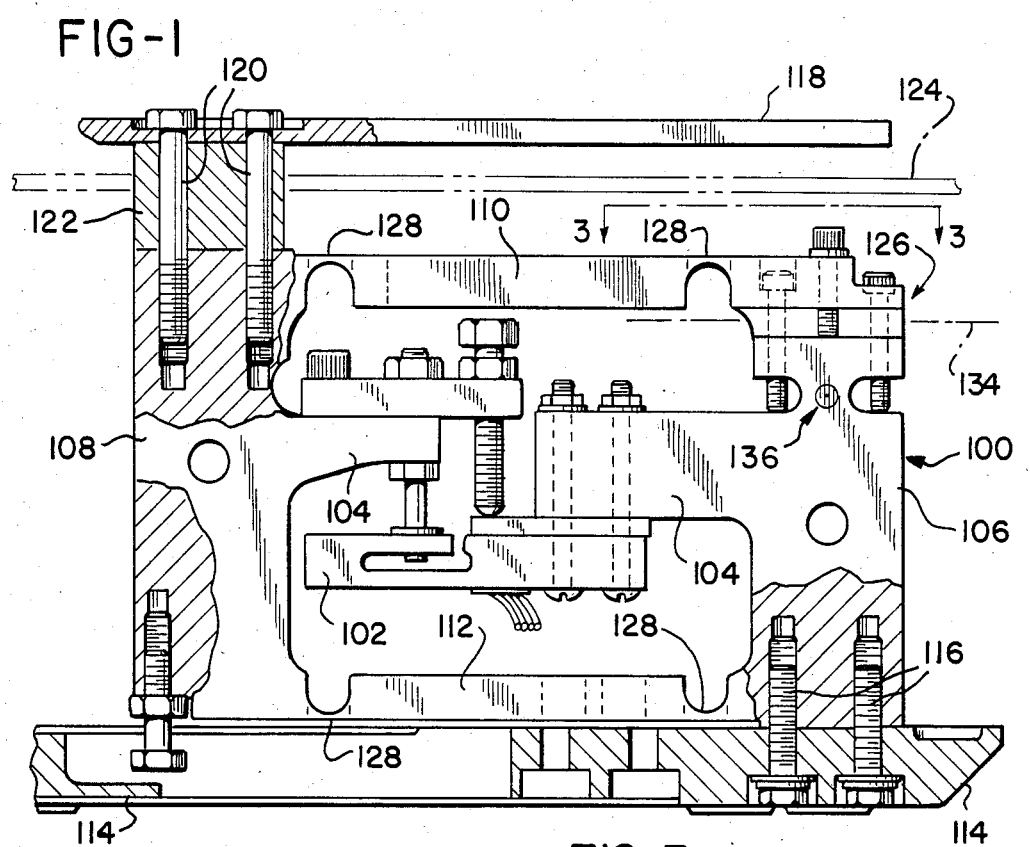
FIG. 1 is a partially sectioned side view of a platform load cell including the flexure shift-error adjuster of the present invention, with the platform load cell being shown as it is mounted in a weighing scale.

FIG. 1 is a partially sectioned side view of a platform load cell including a guiding frame or flexure 100 and showing the platform load cell as it is mounted in a weighing scale. A load cell 102, one of a number of commercially available load cells which include strain gauges, is shown in FIG. 1 coupled to force transmitting beams 104 of the flexure 100. First and second vertically oriented end sections 106 and 108 are interconnected by upper and lower deflection sections 110 and 112 to form a substantially parallelogram structure.

The lower end of the first end section 106 is fixedly mounted to a base 114 of a weighing scale by means of bolts 116. The second end section 108 is cantilevered above the base 114 of the weighing scale to support a weighing platform 118 of the weighing scale incorporating the platform load cell. The weighing platform 118 is secured to the upper end of the second vertically oriented end section 108 by means of bolts 120 and a spacer block 122. An upper side wall 124 of the weighing scale extends beneath the weighing platform 118 and serves to cover and protect the platform load cell as well as the remaining operating structure and circuitry of the weighing scale (not shown).

An object to be weighed can be located anywhere upon the weighing platform 118. The signal generated by the load cell 102 which is coupled to the flexure 100 should be substantially uneffected by shifts in the position of an object to be weighed upon the weighing platform 118. To prevent shift errors, a flexure shift-error adjuster 126 is incorporated into the first vertically oriented end section 106 of the flexure 100. As shown in the illustrative embodiment, the flexure shift-error adjuster 126 is positioned at the upper end of the first vertically oriented end section 106 to facilitate adjustment of the flexure 100 to compensate for off-center loading.

The flexure 100, including the present invention, is preferably milled from a solid piece of metal, such as aluminum, and incorporates the force transmitting beams 104 for supporting the load cell 102. Adjacent to the interconnections of the end sections 106, 108 and the upper and lower deflection sections 110, 112 in the illustrated embodiment, flexjoints 128 are formed to facilitate flexure of the second vertically oriented end section 108 relative to the first vertically oriented end section 106 to thereby transmit forces to the load cell 102. It will be apparent to those skilled in the art that flexjoints 128 are not necessary to the present invention which may be incorporated into a flexure designed to operate without flexjoints.

It has been found that minor dimensional errors between the flexjoints 128 (or the interconnections of the end sections 106, 108 and the upper and lower deflection sections 110, 112 if flexjoints are not used) will result in shift errors in the measured weight or force applied to the weighing platform 118 as an object to be weighed is moved about the platform. In accordance with the present invention, one of the four flexjoints 128 (or one of the four interconnections between the end sections 106, 108 and the upper and lower deflection sections 110, 112) may be adjusted relative to the flexjoint (or interconnection) opposite thereto to essentially eliminate any shift error resulting from various placements of an object to be weighed upon the weighing platform 118.

Figure 2:
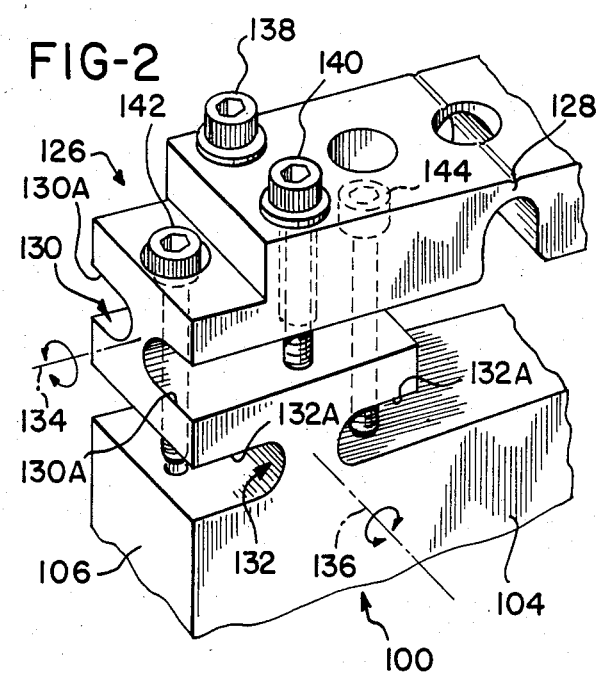
FIG. 2 is a perspective view of the flexure shift-error adjuster of the platform load cell of FIG. 1 shown on an enlarged scale.

As best shown in FIG. 2, the flexure shift-error adjuster 126 comprises first and second flex means comprising first and second reduced thickness portions 130 and 132, respectively, of the first vertically oriented end section 106. The first flex means or first reduced thickness portion 130 is defined by U-shaped slots 130A formed into the front and back of the end section 106 opposite to one another. The first reduced thickness portion 130 defines a first axis 134 substantially parallel to the deflection sections 110, 112. The second flex means or second reduced thickness portion 132 is defined by U-shaped slots 132A formed into the inner and outer side faces of the end section 106 opposite to one another. The second reduced thickness portion 132 defines a second axis 136 substantially perpendicular to the first axis 134 and indicated by an arrow head coming out of the plane of FIG. 1.

First and second adjustable control means are associated respectively with the first and second reduced thickness portions 130 and 132 for setting bends into the first vertically oriented end section 106 about the first and second axes 134 and 136 to adjust the vertical spacing between the flexjoints 128 adjacent to the first vertically oriented end section 106. In the illustrated embodiment, the first and second adjustable control means each comprise first and second adjusting screws aligned with and threadingly engaging the end section 106. The first adjustable control means comprises first and second adjusting screws 138 and 140 and the second adjustable control means comprises first and second adjusting screws 142 and 144.

The first and second adjusting screws 138 and 140 associated with the first reduced thickness portion 130 are positioned on opposite sides of the reduced thickness portion 130 and extend into the U-shaped slots 130A. The first and second adjusting screws 138 and 140 are slidingly received within holes formed through the upper portion of the first end section 106, abut the upper surface of the first end section 106 and are threadingly engaged within the lower portion of the U-shaped slots 130A. In this way, if one of the adjusting screws 138 or 140 is tightened, the first end section 106 is bent about the axis 134 toward that adjusting screw which compresses the opening of the corresponding U-shaped slot 130A.

The first and second adjusting screws 142 and 144 are positioned on opposite sides of the reduced thickness portion 132 defined by the U-shaped slots 132A. The first and second adjusting screws 142 and 144 extend into the U-shaped slots 132A, are threadingly engaged within the upper portion of the first end section 106 and abut the lower portion of the U-shaped slots 132A. In this way, if one of the first and second adjusting screws 142 and 144 are tightened, the end section 106 is bent about the axis 136 away from that adjusting screw which expands the opening of the corresponding U-shaped slot 132A.

Figure 3:
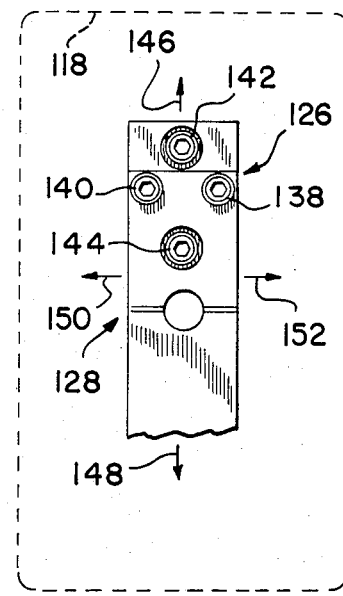
FIG. 3 is a plan view of the flexure shift-error adjuster showing the heads of the adjusting screws and a weighing platform shown on a reduced scale for illustrating adjustment of the flexure.

Adjustment of the flexure shift-error adjuster 126 in accordance with the present invention to compensate for off-center loading of the flexure or off-center positioning of loads on the weighing platform 118 is preferably performed as follows with reference to FIG. 3 wherein the weighing platform 118 is shown on a reduced scale. A 20 lb. weight is centrally located at one end of the weighing platform 118, such as the forward end of the weighing platform 118 indicated by the arrow 146 in FIG. 3., and the weight is observed. The 20 lb. weight is next positioned at the other end of the weighing platform 118 as indicated by the arrow 148 and the weight is once again observed. If the weights are not equal, the adjusting screw 142 or 144 nearest to the end where the highest weight was observed is tightened. The weight is shifted back and forth between the ends of the scale platter 118 as indicated by the arrows 146 and 148 until the weights agree.

The 20 lb. weight is then shifted between the central portion of the sides of the weighing platform 118 as indicated by the arrows 150 and 152. Again, if a weighing error is indicated, the adjustment screw 138 or 140 toward the higher of the two weights is tightened with the weights being shifted back and forth between the central sides of the weighing platform 118 as indicated by the arrows 150 and 152 until the weights agree. This sequence of adjustments may need to be repeated as the second adjustments may slightly affect the first adjustments even though the first adjustments and the second adjustments empirically have proved to be substantially independent of one another. As will be apparent to those skilled in the art, the output signals from the load cell 102 may be connected to a more precisely reading meter to facilitate adjustment of the flexure.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a transducer supporting flexure for a platform load cell comprising first and second vertically oriented end sections which are interconnected by upper and lower deflection sections to form a substantially parallelogram flexure structure, a flexure shift-error adjuster for compensating for off-center loading of said flexure comprising:

first and second flex means formed into one of said end sections for respectively defining a first axis substantially parallel to said deflection sections and a second axis substantially perpendicular to said first axis; and first and second adjustable control means associated, respectively, with said first and second flex means for setting bends into said one of said end sections about said first and second axes to adjust the vertical spacing between the interconnections of said one of said end sections and said upper and lower deflection sections.

2. A flexure shift-error adjuster as claimed in claim 1 wherein said first and second flex means comprise reduced thickness portions of said one of said end sections.

3. A flexure shift-error adjuster as claimed in claim 2 wherein said reduced thickness portions are substantially centered on said one of said end sections and defined by substantially U-shaped slots positioned opposite to one another on opposite sides of said one of said end sections.

4. A flexure shift-error adjuster as claimed in claim 3 wherein said flex means are formed adjacent to one another in one end of said one of said end sections.

5. A flexure shift-error adjuster as claimed in claim 4 wherein said first and second adjustable control means each comprise first and second adjusting screws aligned with and threadingly engaging said one of said end sections, said first and second adjusting screws being positioned on opposite sides of the corresponding reduced thickness portion and extending into the U-shaped slots defining said corresponding reduced thickness portion.

6. In a transducer supporting flexure for a platform load cell comprising first and second vertically oriented end sections which are interconnected by upper and lower deflection sections to form a substantially parallelogram flexure structure with movement of said flexure being facilitated by flexjoints located adjacent the interconnections of said end sections and said deflection sections, a flexure shift-error adjuster for compensating for off-center loading of said flexure comprising:

first and second flex means formed into one of said end sections, said first flex means defining a first axis substantially parallel to said deflection sections and said second flex means defining a second axis substantially perpendicular to said first axis; and first and second adjustable control means associated with said first and second flex means for bending said one of said end sections about said first and second axes, respectively, to adjust the vertical spacing between the flexjoints adjacent said one of said end sections.

7. A flexure shift-error adjuster as claimed in claim 6 wherein said first and second flex means comprise reduced thickness portions of said one of said end sections.

8. A flexure shift-error adjuster as claimed in claim 7 wherein said reduced thickness portions are substantially centered on said one of said end sections and defined by substantially U-shaped slots positioned opposite to one another on opposite sides of said one of said end sections.

9. A flexure shift-error adjuster as claimed in claim 8 wherein said flex means are formed adjacent to one another in one end of said one of said end sections.

10. A flexure shift-error adjuster as claimed in claim 9 wherein said first and second adjustable control means each comprise first and second adjusting screws aligned with and threadingly engaging said one of said end sections, said first and second adjusting screws being positioned on opposite sides of the corresponding reduced thickness portion and extending into the U-shaped slots defining said corresponding reduced thickness portion.

* * * * *